(12) United States Patent
Gould et al.

(10) Patent No.: US 6,588,674 B2
(45) Date of Patent: Jul. 8, 2003

(54) MEMORY MANAGEMENT METHOD AND SMARTCARD EMPLOYING SAME

(75) Inventors: Colin Gould, Greenwich (GB); Warren Ludcke, Para Vista (AU); Dipendra Chowdhary, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 35 days.

(21) Appl. No.: 09/917,129

(22) Filed: Jul. 27, 2001

(65) Prior Publication Data

US 2003/0024993 A1 Feb. 6, 2003

(51) Int. Cl.[7] .............................................. G06K 19/06
(52) U.S. Cl. ........................ 235/492; 711/103; 711/105; 711/165
(58) Field of Search .......................... 235/492; 711/103, 711/105, 165; 709/100

(56) References Cited

U.S. PATENT DOCUMENTS

| | | | | |
|---|---|---|---|---|
| 4,638,430 A | * | 1/1987 | Perra et al. .................. 709/223 |
| 5,136,706 A | * | 8/1992 | Courts .......................... 707/206 |
| 5,802,519 A | | 9/1998 | De Jong |
| 5,802,605 A | * | 9/1998 | Alpert et al. ................ 711/208 |
| 5,809,558 A | * | 9/1998 | Matthews et al. ........... 711/173 |
| 6,327,639 B1 | * | 12/2001 | Asnaashari .................. 707/100 |
| 6,401,149 B1 | * | 6/2002 | Dennin et al. ................. 710/58 |
| 6,487,591 B1 | * | 11/2002 | Budhraja et al. ............ 711/103 |
| 2002/0066792 A1 | * | 6/2002 | Guthery et al. .............. 235/492 |

FOREIGN PATENT DOCUMENTS

WO     WO 00/45262     8/2000

* cited by examiner

*Primary Examiner*—Karl D. Frech
*Assistant Examiner*—Kumiko C. Koyama

(57) ABSTRACT

A memory management method (44) for a memory having program contexts including an active program context in an active region and inactive program contexts in an inactive region. Each program context has a first and a second part. Second parts of the active program context are separated by a contiguous memory space comprising a free memory block and a common data parameter store. In operation, the method swaps (50) a location of the second part of the active program context with the contiguous memory. A swapping step (54) is then effected to swap a location of a the inactive program context with the active program context and any program context therebetween. Another swapping step (56) is then effected to swap a location of a second part of the inactive program context with the contiguous memory space, after which the inactive program context becomes currently active.

11 Claims, 3 Drawing Sheets

MEMORY MANAGEMENT METHOD AND SMARTCARD EMPLOYING SAME

FIELD OF THE INVENTION

The present invention relates in general to memory management, and more particularly, to a method of memory management for memory critical systems such as Smart Cards.

BACKGROUND OF THE INVENTION

Smart Cards come in many forms and have many applications. One commonly known smart card is a Java Card that can support multiple applications. In the rest of this specification, Java Cards will be used by way of example, however, the invention disclosed herein is not necessarily limited to Java Cards.

When considering Java Cards that support multiple applications, runtime-enforced mechanisms known as firewalls are used to isolate memory or data spaces accessible by an application. This basically avoids corruption of instances of currently active applications known as program contexts.

Program contexts include both persistent and non-persistent contexts. The non-persistent context includes a stack and a heap. The heap is used to store temporary objects and fields of transient objects known to those skilled in the art.

Previous implementations of a memory management unit for managing the program contexts on a Java Card have resulted in inefficient use of scarce processor and memory resources on the Java Card. For example, one implementation has objects for different program contexts arranged in a haphazard manner. Access to these objects is on an object-by-object basis. Code for managing such objects is large and often results in slower execution time. There are also implementations that have specific memory sections dedicated to stack and heap use. Such implementations have resulted in inefficient use of memory on the Java Card.

Memory management techniques used in operating systems for larger computers, such as desktop computers, are not ideally suited for implementation on a Java Card or other Smart Cards. Further, current memory management techniques do not effectively provide suitable contiguous free memory availability for memory critical devices.

SUMMARY OF THE INVENTION

According to one aspect of the invention there is provided a memory management method for a memory having a plurality of program contexts including an active program context in an active region and at least one inactive program context in an inactive region, each program context having a first and a second part wherein said first and second parts of said active program context are separated by a contiguous memory space comprising a free memory block and a common data parameter store, said method comprising:
  swapping a location of said second part of said active program context with said contiguous memory space to move said second part to be adjacent said first part of said first program context;
  swapping a location of a said inactive program context with said active program context and any program context therebetween; and
  swapping a location of a second part of said inactive program context with said contiguous memory space, after which said inactive program context becomes currently active.

Suitably, the inactive region may include a segmentation block adjacent the active region, and wherein the method further includes a prior step of:
  moving a first part of the active program context to a location adjacent the at least one inactive program context.

Preferably, the method may further include a subsequent step of:
  moving a first part of the inactive program context to a boundary of the active region.

Suitably, a common data parameter store may be used for passing data from the first program context to the inactive program context.

Preferably, after the step of swapping a location of a second part of the inactive program context, the common data parameter store is adjacent the second part of the active program context.

According to another aspect of the invention there is provided smartcard comprising:
  memory having:
    i) an inactive region with at least one inactive program context, each program context having a first and a second part; and
    ii) an active region with an active program context with a first and second part separated by a contiguous memory space comprising a free memory block and a common data parameter store, wherein in use said smartcard manages memory allocation by:
      a) swapping a location of said second part of said active program context with said contiguous memory space to move said second part to be adjacent said first part of said active program context;
      b) swapping a location of a said inactive program context with said active program context and any program context therebetween; and
      c) swapping a location of a second part of said inactive program context with said contiguous memory space after which said inactive program context becomes currently active.

Preferably, the smartcard may manage memory allocation by a prior step of:
  moving a first part of said active program context to a location adjacent said at least one inactive program context.

Suitably, the smartcard may manage memory allocation by a subsequent step of:
  moving a first part of said inactive program context to a boundary of said active region.

Preferably, the first part of said active program context may be located adjacent a boundary of the active region adjacent the inactive region.

Suitably, the second part may be adjacent a second boundary of the active region.

Preferably, there may be a segmentation block in the inactive region separating the first part of currently active block and the at least one inactive program context.

BRIEF DESCRIPTION OF THE DRAWINGS

In order that the invention may be readily understood and put into practical effect, reference will now be made to a preferred embodiment as illustrated with reference to the accompanying drawings in which.

DETAILED DESCRIPTION OF A PREFERRED EMBODIMENT OF THE INVENTION

Figure 1:
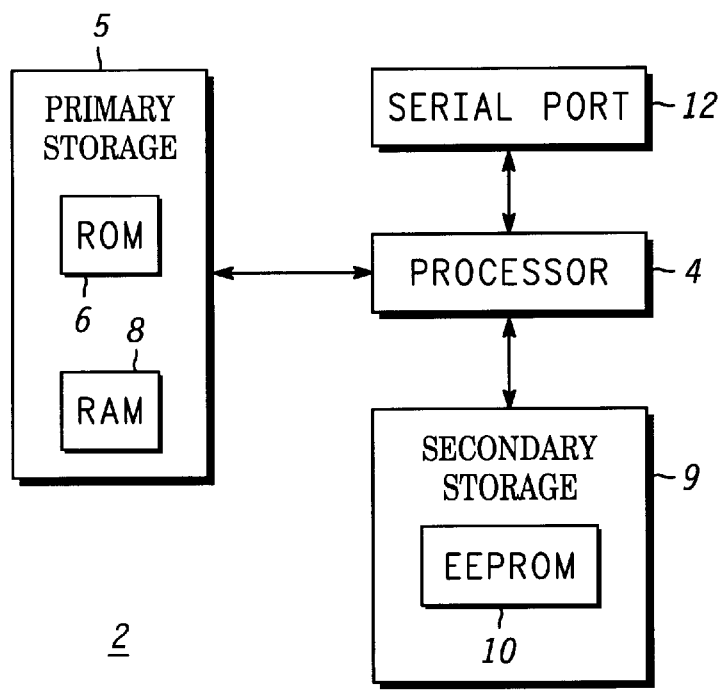
FIG. 1 is a block diagram showing a hardware architecture of a Smart Card in the form of a Java Card according to the present invention.

FIG. 1 is a block diagram of a hardware architecture for a memory critical small footprint device, such as a Java Card 2. The Java Card 2 includes a processor 4 coupled to a primary storage that may include a Read Only Memory (ROM) 6 and/or a Random Access Memory (RAM) 8. The processor 4 is also coupled to both a secondary storage such as an Electrically Erasable Programmable Read Only Memory (EEPROM) 10 and an input/output port, such as a serial port 12.

Figure 2:
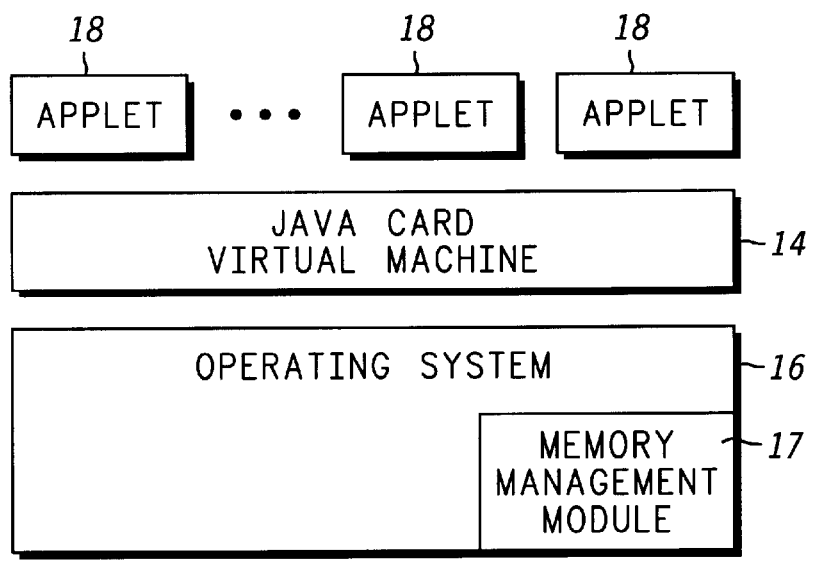
FIG. 2 is a block diagram showing a software architecture of the Java Card in FIG. 1.

FIG. 2 shows a block diagram of a system software architecture of the Java Card 2. The system software includes a Java Card Virtual Machine (JCVM) 14 built on top of an operating system (OS) 16. The OS 16 manages resources such as the processor 4, RAM 8 and EEPROM 10. As will be apparent to a person skilled in the art, the OS 16 includes a memory management module 17 that is responsible for managing program contexts on the Java card 2.

Multiple program contexts separate or isolate different program modules or processes from one another, so that each can operate without undue interference from the others. Interactions, if any, between different program contexts are deliberate rather than accidental, and are carefully controlled so as to preserve integrity of each program context. It will be appreciated by those skilled in the art that a computing environment that provides multiple program contexts also needs to provide a mechanism for associating any given executing code with its corresponding program context.

Applications, commonly called applets 18, are built on the Java Card 2. The applets make use of system services provided by the JCVM 14. Examples of applets 18 are Credit Card applications and Loyalty (frequent flyer) applications. Multiple applets 18 typically reside on one Java Card 2. Each applet 18 is identified uniquely by its application identifier (AID). An applet 18 is in an inactive stage until it is explicitly selected to run. Each applet 18 has an associated persistent and non-persistent program context. Information that must be preserved even when power to the Java Card 2 is removed is stored as objects in a persistent memory, provided by the EEPROM 10. This information constitutes the persistent context of an applet 18.

Figure 3A:
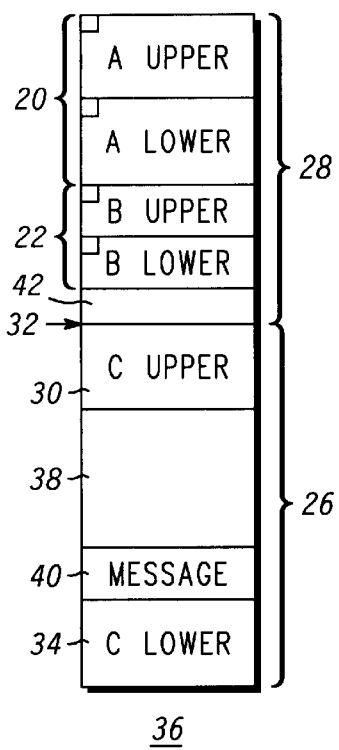
FIGS. 3A–3F illustrates the organization and switching of program contexts in the Java Card of FIG. 1.

There are other objects that are being accessed more frequently and the contents of their fields need not be persistent. These objects are stored in the RAM 8 having a contiguous memory and they form the non-persistent context of an applet 18. FIG. 3A shows several such non-persistent program contexts, stored in RAM 8, including currently inactive program contexts 20, 22 and a currently active program context 24. In this embodiment, the RAM 8 is divided into two regions, an active region 26 and a firewall protected or inactive region 28. The inactive program contexts 20, 22 reside in the inactive region 28. The active program context 24 comprising upper block 30 (which is a first part of a program context) and lower block 34 (which is a second part of a program context) resides in the active region 26. Each of the currently inactive program contexts 20, 22 also includes two parts or blocks which are referred to as first and second inactive program context parts.

An upper block 30 of the currently active program context 24 is located adjacent a first upper boundary 32 of the active region 26. A lower block 34 of the currently active program context 24 is located adjacent a second lower boundary 36 of the active region 26 and is, in this embodiment, basically an execution stack. The upper block 30 contains an object heap and grows downwardly. The lower block contains a stack and grows towards upper memory. Adjacent the lower block 34 is a message block 40 which is basically a common data parameter store for transferring common data between a currently active program context and a future active program context. Accordingly, the message block 40 provides for passing data from the currently active program context (first program context) 24 to a future active program context (which is currently an inactive program context 20, 22). A contiguous memory space comprising a free memory block 38 and the message block 40 separates the upper and lower blocks 30, 34.

During a context switch, any context switching information to be passed from an outgoing program context to an incoming context is written to the free memory block 38 to form a message block 40. The size of the free memory block 38 is thus reduced and typically the message block 40 is located adjacent the lower block 34.

In this embodiment there is a hardware-based firewall in the Java Card 2, therefore the inactive region 28 has to be extended to fit the segmentation scheme of the Java Card 2. This extension of the inactive region to fit into the segment(s) results in what is commonly known as segmentation. The extension of the inactive region results in a segmentation block 42. The segmentation block 42 is located adjacent a lower boundary of the inactive region 28 that is adjoining the first upper boundary 32 of the active region 26.

During a context switch the currently active program context 24 is moved into the inactive region 28 while a currently inactive context, for example program context 20, is moved out of the inactive region 28 into the active region 26 to become the next active program context.

Figure 4:
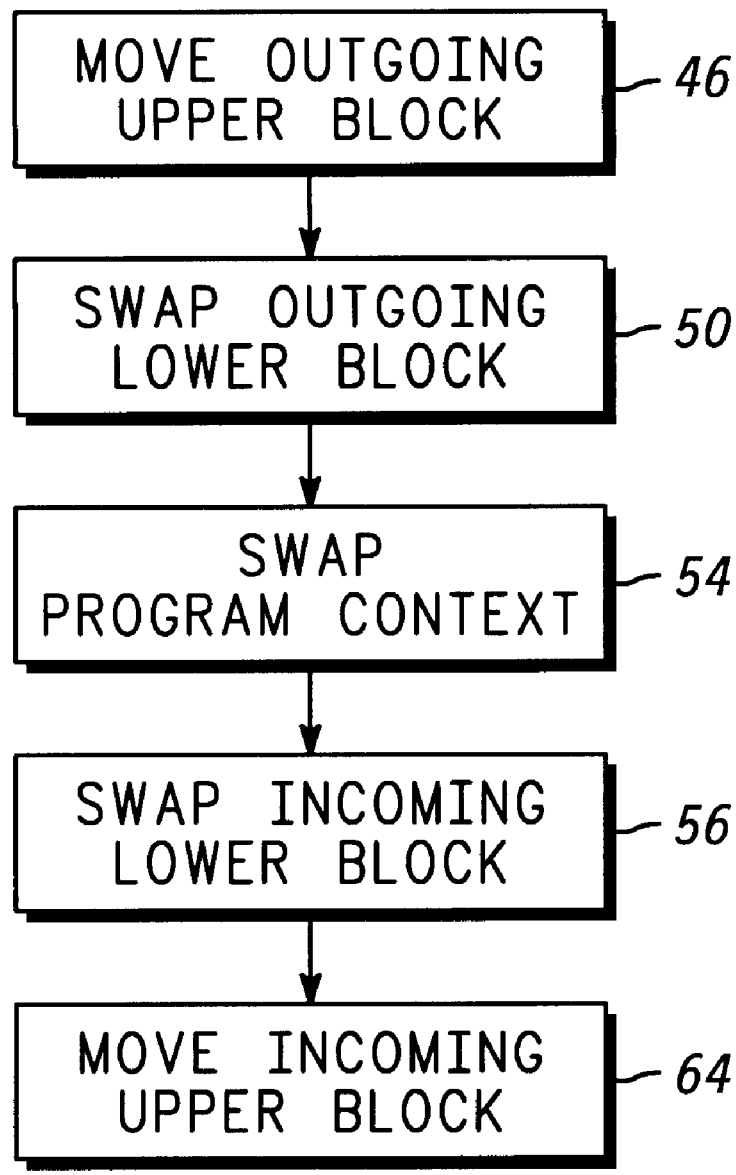
FIG. 4 is a flowchart showing a memory management method for a memory containing a plurality of program contexts of the Java Card of FIG. 1.

FIG. 4 shows a memory management method 44 for managing the program contexts 20, 22, 24 in the RAM 8 during a context switch. An example of context switching information is transactional information from a credit card applet 18 being required to update points on a loyalty (frequent flyer) applet 18.

Figure 3B:
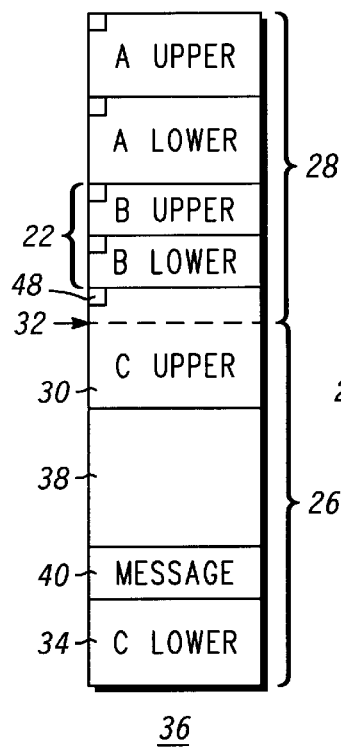

The memory management method 44 will be described by way of the program contexts 20, 22, 24 shown in FIGS. 3A–3F. The memory management method 44 starts with a MOVE OUTGOING UPPER BLOCK step 46, when the Memory Management Module (MMM) 17 is instructed to switch the currently inactive program context 20 to replace the currently active program context 24 as the next active program context. This step is required when there is hardware-based firewall in the Java Card 2. In this step 46, the MMM 17 moves the upper block 30 of the currently active program context 24 into memory space occupied by the segmentation block 42 to abut the inactive program context 22 as shown in FIG. 3B. In doing so, the MMM 17 also adds a header 48 to the upper block 30. Information contained in the header 48 includes an indication that the block is an upper block and an indication of an associated applet 18. The header also includes information relating to the size of the block 30.

Figure 3C:
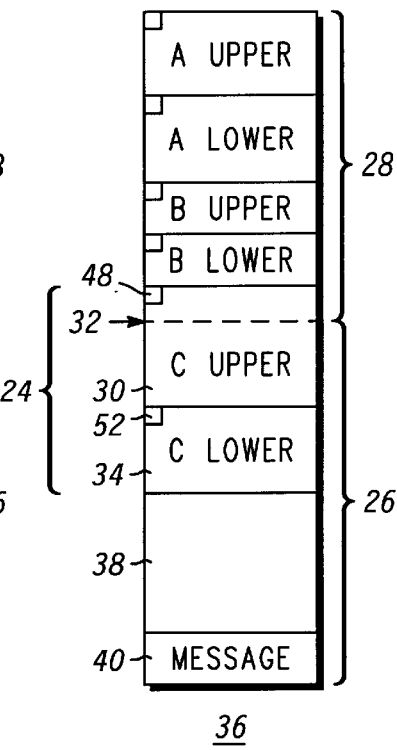

The memory management method 44 next proceeds to a SWAP OUTGOING LOWER BLOCK step 50, where the MMM 17 swaps the location of the lower block 34 of the currently active program context 24 with the contiguous memory space. This swap operation results in the lower block 34 (the second part of the currently active program context) being moved to abut the upper block 30 (the first part of the currently active program context 24). As a result, the message block 40 is positioned adjacent the second boundary 36 of the active region 26 as shown in FIG. 3C. Similarly, the MMM 17 adds a header 52 to the lower block 34. The header 52 includes an indication that the block is a lower block, the AID of an associated applet 18 and information relating to the size of the block 34.

Figure 3D:
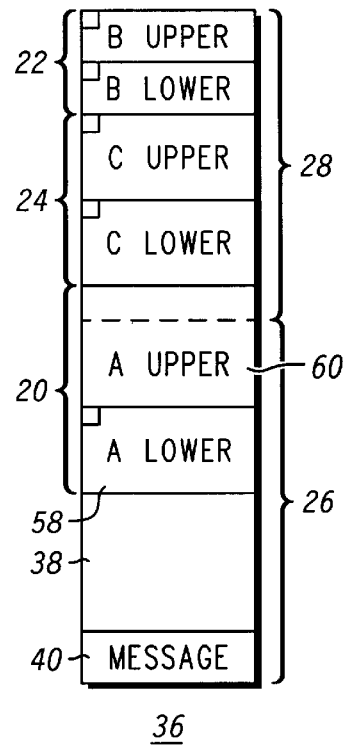

Next, the memory management method 44 proceeds to a SWAP PROGRAM CONTEXT step 54, where the MMM 17 swaps the location of the currently active program context 20 with the currently inactive program context 24 and any program context (program context 22 in this example) between the program contexts 20, 24. This swap operation results in the currently inactive program context 20 being moved to the bottom of the stack of program contexts 20, 22, 24 as shown in FIG. 3D.

Figure 3E:
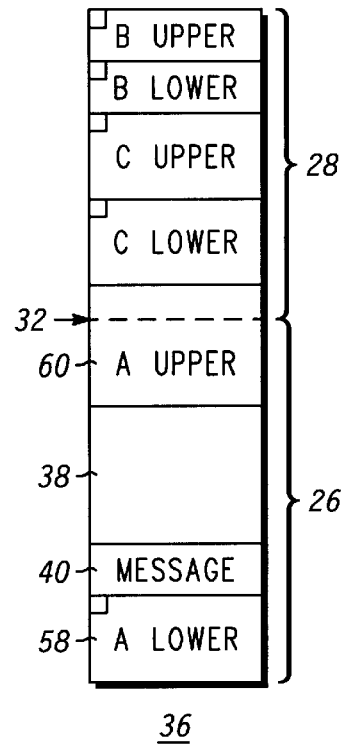
Figure 3F:
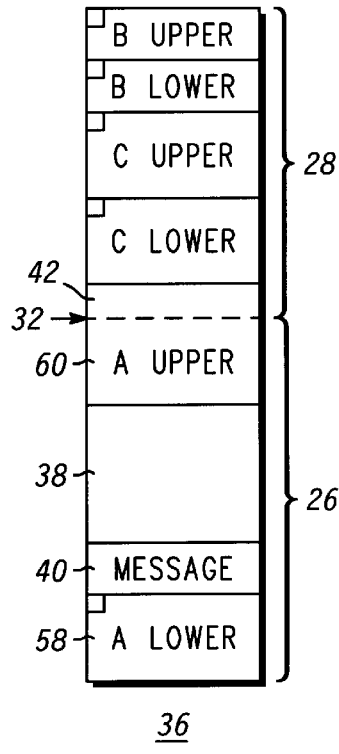

The memory management method 44 next proceeds to a SWAP INCOMING LOWER BLOCK step 56, where the MMM 17 swaps the location of lower block 58, which is the second part of the program context 20, with that of the contiguous memory space. This swap operation results in the lower block 58 being moved to a position adjacent the second boundary 36 of the active region 26 and the message block 40 being adjacent the lower block 58. The contiguous memory space separates an upper block 60 (the first part of the program context 20) and the lower block 58 of the program context 20 as shown in FIG. 3E. The MMM 17 also removes a header 62 from the lower block 58. The above steps results in the inactive program context 20 becoming a currently active program context and the program context 24 becoming inactive.

The memory management method 44 ends in a MOVE INCOMING UPPER BLOCK step 64, where the MMM 17 moves the upper block 60 into memory space occupied by the free memory block 38 in the active region 26 to be adjacent the first boundary 32. Again, this step is required when there is hardware-based firewall in the Java Card 2. It should be noted that the position of the first boundary 32 and size of the inactive region 28 may be varied to accommodate vary sized inactive program contexts. This moving of the upper block 60 results in a segmentation block 42 in the inactive region 28 to allow the inactive region 28 to fit into a segment or segments of the firewall hardware. Thus, upper block 60 is separated, by segmentation block 42, from the inactive program contexts 22, 24. The MMM 17 removes a header 66 from the upper block 60. Context switching is complete and the predetermined program context 20 becomes the new active program context. After completing the memory management method 44, the inactive program context 20 becomes currently active and the active program context 24 becomes inactive.

In table 1 below, there is illustrated program code used to implement the swap steps 50, 54 and 56 in the memory management method 44.

TABLE 1

```
/**
* This function swaps the contents of two adjoining blocks of data.
*
* @param start A pointer to the start of the lower block to be swapped.
* @param sizeA The size of the block beginning from the start address.
```

TABLE 1-continued

```
* @param end A pointer to the byte immediately following the upper
*              block to swap.
*/
static void swap( byte* start,unsigned int sizeA, byte* end )
{
    int sizeB = (int)end − (int)start − sizeA;  /* size of block B */
    int init_start_index = 0;      /* Intial source index */
    int dest_index = sizeB;        /* current destination
                                      index */
    byte temp[2];                  /* temporary buffer for data being
                                      moved */
    int temp_index = 0;            /* index of temp buffer to use.
                                      This just alternates between 0 and 1 */
    /* Only perform swap if both sizes are non zero */
    if((sizeA > 0)&&(sizeB > 0))
    {
        /* Initialise the temp buffer to contain the first byte being
           moved*/
        temp[1] = start[0];
        /* Loop for each element in the given array */
        while(end > start)
        {
            /* backup the location that is about to be written to */
            temp[temp index] = start[dest_index];
            /* point to the other temp buffer */
            temp_index ^= 0x1;
            /* write the previous value to the new location */
            start[dest_index] = temp[temp_index];
            /* Test if the location just written to has already been
               swapped */
            if( dest_index == init_start_index )
            {
                /* If so, then we need to change the source to be
                   copied to the next incremental location */
                temp[temp_index^1] = start[++init_start_index];
                /* The destination for this is then calculated */
                dest_index = init_start_index + sizeB;
            }else
                /* Otherwise calculate the destination of the data
                   just backed up */
                dest_index = ((dest_index<sizeA)?
                (dest_index+sizeB):
                              (dest_index-sizeA));
            end--;
        }
    }
}
```

Advantageously, the memory management method 44 alleviates problems of limited contiguous free memory availability for use by an active program context. By dividing a program context into an upper and a lower block for containing a stack and a heap respectively that grow from opposite ends of the active region 26, efficient use of scarce memory in the Java Card 2 is achieved. Accordingly, the invention also effectively provides for contiguous free memory availability for memory critical devices such as Java Cards and other forms of Smart Cards.

Although the invention has been described with reference to the preferred embodiment, it is to be understood that the invention is not restricted to the embodiment described herein. For example, the memory management method 44 is also applicable for switching program contexts in the persistent memory.

We claim:

1. A memory management method for a memory having a plurality of program contexts including an active program context in an active region and at least one inactive program context in an inactive region, each program context having a first and a second part wherein said first and second parts of said active program context are separated by a contiguous memory space comprising a free memory block and a common data parameter store, the contiguous memory space comprising art of the active program context, said method comprising:

swapping a location of said second part of said active program context with said contiguous memory space to move said second part to be adjacent said first part of said first program context;

swapping a location of a said inactive program context with said active program context and any program context therebetween; and swapping a location of a second part of said inactive program context with said contiguous memory space, after which said inactive program context becomes currently active.

2. A method according to claim 1, wherein said inactive region further includes a segmentation block adjacent said active region, and wherein said method further includes a prior step of:

moving a first part of said active program context to a location adjacent said at least one inactive program context.

3. A method according to claim 2, wherein said method further includes a subsequent step of:

moving a first part of said inactive program context to a boundary of said active region.

4. A method according to claim 1, wherein common data parameter store is used for passing data from the first program context to the inactive program context.

5. A method according to claim 1, wherein after said step of swapping a location of a second part of said inactive program context, said common data parameter store is adjacent said second part of said active program context.

6. A smartcard comprising;

A memory having:
  i) an inactive region with at least one inactive program context, each program context having a first and a second part; and
  ii) an active region with an active program context with a first and second part separated by a contiguous memory space comprising a free memory block and a common data parameter store, the contiguous memory space comprising part of the active program context, wherein in use said smartcard manages memory allocation by:
    a) swapping a location of said second part of said active program context with paid contiguous memory space to move said second part to be adjacent said first part of said active program context;
    b) swapping a location of a said inactive program context with said active program context and any program context therebetween; and
    c) swapping a location of a second part of said inactive program context with said contiguous memory space after which said inactive program context becomes currently active.

7. A smartcard memory according to claim 6, further characterized by said smartcard managing memory allocation by a prior step of:

moving a first part of said active program context to a location adjacent said at least one inactive program context.

8. A smartcard memory according to claim 7, further characterized by said smartcard managing memory allocation by a subsequent step of:

moving a first part of said inactive program context to a boundary of said active region.

9. A memory according to claim 6, wherein said first part of said active program context is located adjacent a boundary of said active region adjacent said inactive region.

10. A memory according to claim 6, wherein said second part is adjacent a second boundary of said active region.

11. A memory according to claim 6, further including a segmentation block in maid inactive region separating said first part of currently active block and said at least one inactive program context.

* * * * *